US012143836B2

(12) United States Patent
Reeves

(10) Patent No.: US 12,143,836 B2
(45) Date of Patent: Nov. 12, 2024

(54) OPTIMIZATION OF DEVICE CONFIGURATION RELATING TO WIRELESS ACCESS TECHNOLOGIES

(71) Applicant: T-MOBILE INNOVATIONS LLC, Overland Park, KS (US)

(72) Inventor: Raymond Emilio Reeves, Orlando, FL (US)

(73) Assignee: T-Mobile Innovations LLC, Overland Park, KS (US)

( * ) Notice: Subject to any disclaimer, the term of this patent is extended or adjusted under 35 U.S.C. 154(b) by 372 days.

(21) Appl. No.: 17/741,046

(22) Filed: May 10, 2022

(65) Prior Publication Data

US 2023/0370865 A1    Nov. 16, 2023

(51) Int. Cl.
*H04W 24/02* (2009.01)
*H04W 88/06* (2009.01)

(52) U.S. Cl.
CPC ............ *H04W 24/02* (2013.01); *H04W 88/06* (2013.01)

(58) Field of Classification Search
CPC ...... H04W 24/02; H04W 88/06; H04W 76/15
See application file for complete search history.

(56) References Cited

U.S. PATENT DOCUMENTS

| 8,023,937 | B2 * | 9/2011 | Fok | H04W 24/00 455/418 |
| 8,422,994 | B2 * | 4/2013 | Rhoads | G06F 18/24 455/411 |
| 8,762,488 | B2 * | 6/2014 | Swenson | H04L 67/306 709/224 |
| 9,113,353 | B1 * | 8/2015 | Cotanis | H04W 16/18 |
| 9,622,136 | B2 * | 4/2017 | Zhang | H04W 36/008375 |
| 10,015,681 | B2 * | 7/2018 | Agarwal | H04W 24/02 |
| 10,650,652 | B1 * | 5/2020 | Weingart | G08B 13/22 |
| 10,659,088 | B2 | 5/2020 | Manssen et al. | |
| 11,049,094 | B2 * | 6/2021 | Filler | G06F 3/0486 |
| 11,176,794 | B1 * | 11/2021 | Weingart | G08B 25/10 |

(Continued)

FOREIGN PATENT DOCUMENTS

| CN | 101300870 B | 7/2012 |
| EP | 3030004 B1 | 7/2018 |

(Continued)

OTHER PUBLICATIONS

ETSI TS 132 42, "Digital cellular telecommunications system (Phase 2+) (GSM); Universal Mobile Telecommunications System (UMTS); LTE; Telecommunication management; Subscriber and equipment trace; Trace concepts and requirements", 3GPP TS 32.421 version 16.1.0 Release 16, 2020.

*Primary Examiner* — Hai V Nguyen
(74) *Attorney, Agent, or Firm* — Shook, Hardy & Bacon L.L.P.

(57) ABSTRACT

The technology described herein improves management of the optimization of a device configuration associated with one or more wireless communication technologies. An analysis is performed using performance data and device capability information for a plurality of user devices. An optimal device configuration associated with one or more wireless communication technologies is determined for one or more identified user devices of the plurality of user devices. The one or more identified user devices are instructed to operate using the determined optimized device configuration.

20 Claims, 5 Drawing Sheets

(56) References Cited

U.S. PATENT DOCUMENTS

| | | | | |
|---|---|---|---|---|
| 11,246,078 | B2* | 2/2022 | Çetinkaya | H04W 4/027 |
| 11,356,349 | B2* | 6/2022 | Cui | H04M 15/80 |
| 11,395,207 | B2* | 7/2022 | Rugeland | H04W 36/00837 |
| 11,405,803 | B2* | 8/2022 | Fiorese | H04W 24/02 |
| 11,411,757 | B2* | 8/2022 | Cui | G10L 15/26 |
| 11,716,663 | B2* | 8/2023 | Liou | H04W 36/305 370/225 |
| 11,729,635 | B2* | 8/2023 | Mishra | H04W 36/22 370/252 |
| 11,751,078 | B2* | 9/2023 | Kim | H04W 24/08 455/422.1 |
| 11,768,082 | B2* | 9/2023 | Cui | G01C 21/3691 701/533 |
| 11,810,437 | B2* | 11/2023 | Weingart | G08B 25/008 |
| 11,843,980 | B2* | 12/2023 | Naseer-Ul-Islam | H04W 36/008375 |
| 11,902,134 | B2* | 2/2024 | Cui | H04M 15/49 |
| 11,963,041 | B2* | 4/2024 | Chou | H04W 28/0862 |
| 11,979,943 | B2* | 5/2024 | Chou | H04W 24/02 |
| 12,010,735 | B2* | 6/2024 | Da Silva | H04W 76/16 |
| 12,022,439 | B2* | 6/2024 | Hwang | H04W 72/02 |
| 2006/0198359 | A1* | 9/2006 | Fok | H04W 24/10 709/233 |
| 2012/0113894 | A1* | 5/2012 | Yang | H04W 60/04 370/328 |
| 2014/0126425 | A1* | 5/2014 | Burd | G06Q 50/06 370/255 |
| 2015/0131454 | A1* | 5/2015 | Wegmann | H04W 24/10 370/242 |
| 2015/0139197 | A1* | 5/2015 | He | H04L 65/1104 370/336 |
| 2015/0181494 | A1* | 6/2015 | Zhang | H04W 36/008375 370/331 |
| 2016/0127972 | A1* | 5/2016 | Ananthanarayanan | H04W 76/30 370/332 |
| 2017/0156174 | A1* | 6/2017 | Chaponniere | H04W 48/16 |
| 2018/0338250 | A1* | 11/2018 | Mishra | H04W 24/02 |
| 2018/0368099 | A1* | 12/2018 | Chen | H04W 48/18 |
| 2019/0208474 | A1* | 7/2019 | Ali | H04W 84/20 |
| 2019/0349858 | A1* | 11/2019 | Jantzi | H04W 76/28 |
| 2019/0384379 | A1* | 12/2019 | Huh | G09B 19/00 |
| 2020/0154287 | A1* | 5/2020 | Novlan | H04W 36/0069 |
| 2020/0187025 | A1* | 6/2020 | Agarwal | H04W 24/02 |
| 2020/0313794 | A1* | 10/2020 | Chandramouli | H04W 76/15 |
| 2021/0021494 | A1* | 1/2021 | Yao | H04L 41/5009 |
| 2021/0022061 | A1* | 1/2021 | Chou | H04W 36/30 |
| 2021/0037400 | A1* | 2/2021 | Yao | H04W 24/04 |
| 2021/0049818 | A1* | 2/2021 | Lee | H04W 4/029 |
| 2021/0100061 | A1* | 4/2021 | Park | H04W 76/27 |
| 2021/0219151 | A1* | 7/2021 | Fiorese | H04W 24/02 |
| 2021/0219217 | A1* | 7/2021 | Hedberg | H04W 8/18 |
| 2021/0243592 | A1* | 8/2021 | Chou | H04W 24/02 |
| 2021/0266729 | A1* | 8/2021 | Casati | H04W 8/22 |
| 2021/0314839 | A1* | 10/2021 | Çetinkaya | H04W 36/324 |
| 2021/0337437 | A1* | 10/2021 | Naseer-Ul-Islam | H04W 36/008375 |
| 2021/0345203 | A1* | 11/2021 | Balasubramanian | H04W 36/00835 |
| 2021/0345204 | A1* | 11/2021 | Matolia | H04W 36/00698 |
| 2021/0377827 | A1* | 12/2021 | Yao | H04W 36/0083 |
| 2022/0007255 | A1* | 1/2022 | Rugeland | H04W 36/305 |
| 2022/0076549 | A1* | 3/2022 | Weingart | G08B 25/10 |
| 2022/0085860 | A1* | 3/2022 | Bali | H04B 7/0632 |
| 2022/0086699 | A1* | 3/2022 | Claeson | H04W 28/0273 |
| 2022/0086747 | A1* | 3/2022 | Bucknell | H04W 48/18 |
| 2022/0141738 | A1* | 5/2022 | Chou | H04W 28/0268 455/437 |
| 2022/0182473 | A1* | 6/2022 | Klomsdorf | H01Q 1/08 |
| 2022/0200856 | A1* | 6/2022 | Kawasaki | H04L 41/50 |
| 2022/0210670 | A1* | 6/2022 | Kawasaki | H04W 24/02 |
| 2022/0217597 | A1* | 7/2022 | Ishii | H04W 36/00838 |
| 2022/0225369 | A1* | 7/2022 | Park | H04W 72/23 |
| 2022/0248488 | A1* | 8/2022 | Sen | H04W 76/28 |
| 2022/0264305 | A1* | 8/2022 | Hu | H04W 8/26 |
| 2022/0286812 | A1* | 9/2022 | Alawieh | H04W 24/08 |
| 2022/0330371 | A1* | 10/2022 | Shi | H04W 4/40 |
| 2022/0360975 | A1* | 11/2022 | Oh | H04W 76/10 |
| 2022/0361118 | A1* | 11/2022 | Lee | H04W 52/262 |
| 2022/0377800 | A1* | 11/2022 | Chin | H04W 74/0833 |
| 2023/0008399 | A1* | 1/2023 | Akdim | H04W 36/00835 |
| 2023/0060537 | A1* | 3/2023 | Da Silva | H04W 36/362 |
| 2023/0068134 | A1* | 3/2023 | Teyeb | H04W 76/27 |
| 2023/0132095 | A1* | 4/2023 | Mueller | H04W 76/14 370/329 |
| 2023/0189374 | A1* | 6/2023 | Ramachandra | H04W 36/305 370/329 |
| 2023/0199659 | A1* | 6/2023 | Zhou | H04L 5/0078 370/318 |
| 2023/0209585 | A1* | 6/2023 | Mangrulkar | H04W 52/247 370/329 |
| 2023/0245109 | A1* | 8/2023 | Srivastava | G06Q 20/4012 705/40 |
| 2023/0276192 | A1* | 8/2023 | Cotanis | H04W 24/04 455/419 |
| 2023/0276291 | A1* | 8/2023 | Ibrahim | H04W 72/0453 370/328 |
| 2023/0284312 | A1* | 9/2023 | Parichehrehteroujeni | H04W 76/11 370/216 |
| 2023/0337186 | A1* | 10/2023 | Toskala | H04W 68/02 |
| 2023/0354332 | A1* | 11/2023 | Cirik | H04W 72/23 |
| 2023/0362774 | A1* | 11/2023 | Chang | H04W 36/362 |
| 2023/0397080 | A1* | 12/2023 | Parichehrehteroujeni | H04W 36/305 |
| 2023/0397281 | A1* | 12/2023 | Koshta | H04W 48/18 |
| 2024/0029531 | A1* | 1/2024 | Weingart | G08B 25/10 |
| 2024/0049098 | A1* | 2/2024 | Wang | H04W 24/02 |
| 2024/0073109 | A1* | 2/2024 | Vaishnavi | H04L 41/5058 |
| 2024/0155478 | A1* | 5/2024 | Gandikota | H04W 28/24 |
| 2024/0196236 | A1* | 6/2024 | Chou | H04W 24/02 |

FOREIGN PATENT DOCUMENTS

| | | | | |
|---|---|---|---|---|
| EP | 3923631 | A1* | 12/2021 | H04W 36/18 |
| JP | 6461817 | B2 | 1/2019 | |
| WO | 2005094371 | A3 | 10/2005 | |
| WO | WO-2021002731 | A1* | 1/2021 | G01S 5/0236 |

* cited by examiner

OPTIMIZATION OF DEVICE CONFIGURATION RELATING TO WIRELESS ACCESS TECHNOLOGIES

SUMMARY

The present disclosure is directed, in part, to systems and methods for managing the optimization of a device configuration associated with one or more wireless communication technologies.

According to various aspects of the technology, one or more user devices may be identified as having a modified configuration associated with use of a wireless communication technology and may be instructed to operate using a determined optimized device configuration. Many user devices are capable of using both 4G and 5G wireless communication technologies. As the operating environment of a highly mobile user device changes, it may find itself in an environment where it is experiencing poor performance, such that a configuration associated with the use of a wireless communication technology may be modified (e.g., changed from 4G/5G to only 4G). Conventionally, the user device would remain operating in the modified configuration even if the user device entered into an environment that could provide an enhanced experience if it were using an optimized configuration (e.g., 4G back to 4G/5G). To provide a better experience, user devices, which have had their device configuration modified, can be identified and instructed to operate using an optimized device configuration in order to enhance their network experience.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Illustrative embodiments of the present invention are described in detail below with reference to the attached drawing figures, and wherein.

DETAILED DESCRIPTION

Figure 1:
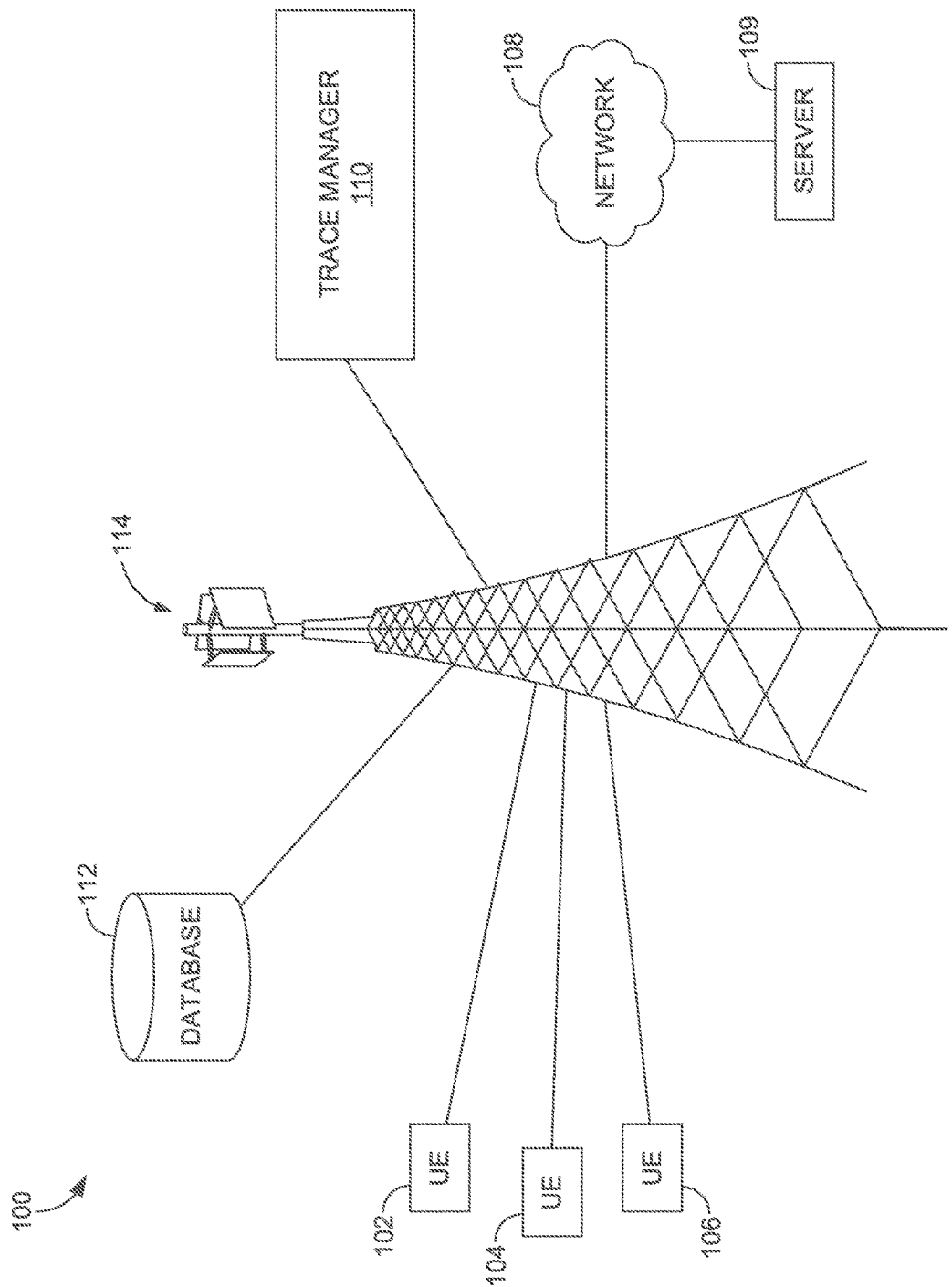
FIG. 1 depicts an exemplary wireless telecommunications network, according to an implementation of an embodiment of the present invention.

The subject matter of embodiments of the invention is described with specificity herein to meet statutory requirements. However, the description itself is not intended to limit the scope of this patent. Rather, the inventor has contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

By way of background, network providers may frequently have an acceleration of churn metrics (e.g., subscriber turnover) when migrating user equipment ("UE") and/or users into a 5G network and 5G capable devices. The accelerated churn metrics may be due to the user's network experience being below what was expected upon effecting the configuration and subscription changes. Research has discovered that many users deactivate 5G capabilities when user experience is low, but 5G tends to remain deactivated even when using services within a region with excellent 5G coverage. For example, a user device may operate in ever-changing network environments. When user experience is low because of connection issues, dropped calls, etc., it is not uncommon for a user of the user device to manually modify the wireless communication technology settings of the user device. For example, when one or more call quality indicators or key performance indicators (KPIs) are below a threshold, the user experience may drop, which may cause the user to modify one or more settings on the user device relating to the wireless communication technology (e.g., 4G, 5G) currently being used by the user device.

For instance, a user device may be capable of communicating in both 4G and 5G in a city, but when the user device moves to a nearby suburb, the quality of the experience may degrade, leading the owner to modify the wireless communication technology being used by disabling 5G. After an increase in the quality of the experience following the modification of the wireless communication technology being used, the user device is often left to operate in the modified configuration even when the user device is using services within a region with excellent 5G coverage (i.e., when the user device returns to the city where 5G coverage and signal strength is strong, the user device continues to operate in the modified configuration when a better experience could be achieved by enabling 5G). This problem greatly decreases the penetration of new services like Voice Over New Radio (VoNR) and VoWiFi. Accordingly, there is a great impetus for identifying and implementing a means to increase a subscriber's experience in seamless ways.

In order to solve this problem, the present disclosure is directed to systems, methods, and computer readable media for identifying user devices with modified configurations associated with use of a wireless communication technology, and instructing the user devices to operate using a determined optimized device configuration. Part of the inventive solution includes taking advantage of a trace infrastructure within an existing telecommunication network to receive performance data that is indicative of the experience of an individual user at a specific location. Combining the performance data with device capability information, a user device can be identified as having modified its wireless communication technology configuration when, for example, the experience of proximate devices shows that the identified user device is not using an optimal device configuration for which it is capable of using. By determining an optimal device configuration and instructing the user device to operate using the determined optimal device configuration, we are not only solving the current problem but are also providing a way to dynamically manage wireless communication technology configurations more broadly that can efficiently optimize the experience of each user device on command.

Accordingly, a first aspect of the present disclosure is directed to a method for managing device configuration optimization over a wireless communications network, the method comprising receiving performance data for a plurality of user devices. The method further comprises accessing device capability information associated with the plurality of user devices. The method further comprises identifying at least one of the plurality of user devices whose configuration associated with use of a wireless communication technology has been modified based on an analysis of the device capability information and the performance data. The method further comprises determining an optimized device configuration for the at least one of the plurality of user devices; and instructing the at least one of the plurality of user devices to operate using the determined optimized device configuration.

A second aspect of the present disclosure is directed to a method for managing device configuration optimization over a wireless communications network, the method comprising receiving performance data associated with a plurality of user devices. The method further comprises accessing device capability information associated with the plurality of user devices. The method further comprises performing one or more of a geo-service analysis or a compatibility analysis using the performance data and device capability information. The method further comprises determining a current device configuration and an optimal device configuration for one or more user devices of the plurality of user devices based on the one or more of the geo-service analysis or the compatibility analysis, wherein the device configuration is associated with use of a wireless communication technology. The method further comprises identifying at least one user device of the one or more user devices whose determined current device configuration is different from the determined optimal device configuration; and instructing the at least one user device whose determined current device configuration is different from the determined optimal device configuration to operate using the determined optimized device configuration.

A third aspect of the present disclosure is directed to a system for managing device configuration optimization over a wireless communications network, the system comprising a mobile communications network that includes one or more wireless communication technologies. The system further comprising a trace processor configured to process trace reports and provide the trace reports to a trace manager, wherein the trace manager is configured to receive performance data associated with a plurality of user devices, perform an analysis of the device capability information and the performance data, identifying at least one of the plurality of user devices whose configuration associated with a wireless communication technology has been modified, determine an optimized device configuration for the at least one of the plurality of user devices; and instruct the at least one of the plurality of user devices to operate using the determined optimized device configuration.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of aspects herein.

Embodiments herein may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media includes media implemented in any way for storing information. Examples of stored information include computer-useable instructions, data structures, program circuitry, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer-program product that includes computer-useable or computer-executable instructions embodied on one or more computer-readable media.

"Computer-readable media" may be any available media and may include volatile and nonvolatile media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program circuitry, or other data. In this regard, computer storage media may include, but is not limited to, Random-Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage devices, or any other medium which may be used to store the desired information and which may be accessed by the computing device 500 shown in FIG. 5. Computer storage media does not comprise a signal per se.

"Communication media" may include, without limitation, computer-readable instructions, data structures, program circuitry, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

A "network" refers to a network comprised of wireless and wired components that provide wireless communications service coverage to one or more user equipment (UE). The network may comprise one or more base stations, one or more cell sites (i.e., managed by a base station), one or more cell towers (e.g., having an antenna) associated with each base station or cell site, a gateway, a backhaul server that connects two or more base stations, a database, a power supply, sensors, and other components not discussed herein, in various embodiments.

The terms "base station" and "cell site" may be used interchangeably herein to refer to a defined wireless communications coverage area (e.g., a geographic area) serviced by a base station. It will be understood that one base station may control one cell site or alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

An "access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO (massive multiple-input/multiple-output)) as discussed herein.

The terms "user equipment," "UE," and/or "user device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, UE may take on any variety of devices, such as a personal computer, a laptop computer, a tablet, a netbook, a mobile phone, a smart phone, a personal digital assistant, a wearable device, a fitness tracker, or any other device capable of communicating using one or more resources of the network. UE may include components such as software and hardware, a processor, a memory, a display component, a power supply or power source, a speaker, a touch-input component, a keyboard, and the like. In embodiments, some of the UE discussed herein may include current UE capable of using 5G and having backward compatibility with prior access technologies (e.g., Long-Term Evolution (LTE)), current UE capable of using 5G and lacking backward compatibility with prior access technologies, and legacy UE that is not capable of using 5G.

Additionally, it will be understood that terms such as "first," "second," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such. Along similar lines, certain UE are described herein as being "priority" UE and non-priority UE, but it should be understood that in certain implementations UE may be distinguished from other UEs based on any other different or additional features or categorizations (e.g., computing capabilities, subscription type, and the like).

The terms "servicing" and "providing signal coverage," "providing network coverage," and "providing coverage," are interchangeably used to mean any (e.g., telecommunications) service(s) being provided to user devices. Moreover, "signal strength", "radio conditions," "level of coverage," and like, are interchangeably used herein to refer to a connection strength associated with a user device. For example, these terms may refer to radio conditions between a user device and a beam providing coverage to the user device. In particular, the "signal strength," "level of coverage," and like may be expressed in terms of synchronization signal (SS) measurements/values and/or channel state information (CSI) measurements/values. In the context of 5G, signal strength may be measured by user devices, which may communicate the signal strength to the cell site and/or the beam management system disclosed herein. In particular, a user device may report various measurements. For example, a user device may provide signal strength as certain synchronization signal (SS) measurements, such as a SS reference signal received power (SS-RSRP) value/measurement, a SS Reference Signal Received Quality (SS-RSRQ) value/measurement, a SS signal-to-noise and interference ratio (SS-SINR) value/measurement, and/or the like. Alternatively or additionally, in some embodiments, signal strength may also be measured and provided in terms of channel state information (CSI) values.

Referring to FIG. 1, an exemplary network environment suitable for use in implementing embodiments of the present disclosure is provided. Such a network environment as illustrated in FIG. 1 is designated generally as network environment 100. Network environment 100 is simplified to illustrate devices, components, and modules in merely one of many suitable configurations and arrangements, such that configurations and arrangements of devices, components, and modules relative to one another, as well as the and the quantity of each of the devices, components, and modules, can vary from what is depicted (e.g., devices, components, and modules may be omitted and/or could be greater in quantity than shown). As such, the absence of components from FIG. 1 should be not be interpreted as limiting the present invention to exclude additional components and combination(s) of components. Similarly, the computing environment 100 should not be interpreted as imputing any dependency between devices, components, and modules, and nor imputing any requirements with regard to each of the devices, components, modules, and combination(s) of such, as illustrated in FIG. 1. Also, it will be appreciated by those having ordinary skill in the art that the connections illustrated in FIG. 1 are also exemplary as other methods, hardware, software, and devices for establishing a communications link between the components, devices, systems, and entities, as shown in FIG. 1, may be utilized in implementation of the present invention. Although the connections are depicted using one or more solid lines, it will be understood by those having ordinary skill in the art that the exemplary connections of FIG. 1 may be hardwired or wireless, and may use intermediary components that have been omitted or not included in FIG. 1 for simplicity's sake.

Network environment 100 includes user devices 102, 104, and 106, access point 114 (which may be a cell site, node, base transceiver station (also known as a base station), communication tower, a small cell, or the like), network 108, server 109, UE experience analyzing trace manager 110, and database 112. In network environment 100, user devices can take on a variety of forms, such as a personal computer (PC), a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the server 109 or the computing device 500 of FIG. 5) that communicates via wireless communications with the access point 114 in order to interact with a public or private network. In this regard, the user device can be any mobile computing device that communicates by way of a wireless network, for example, a 1× circuit voice, a 3G network (e.g., CDMA, CDMA2000, WCDMA, GSM, UMTS), a 4G network (WiMAX, LTE, HSDPA), a 5G network, or any other type of network.

In some cases, the user devices 102, 104, and 106 in network environment 100 can optionally utilize network 108 to communicate with other computing devices (e.g., a mobile device(s), a server(s), a personal computer(s), etc.) through access point 114. The network 108 may be a telecommunications network(s), or a portion thereof. A telecommunications network might include an array of devices or components (e.g., one or more base stations), some of which are not shown. Those devices or components may form network environments similar to what is shown in FIG. 1, and may perform methods in accordance with the present disclosure. Components, such as terminals, links, and nodes (as well as other components) can provide connectivity in various implementations. Network 108 can include multiple networks, as well as being a network of networks, but is shown in more simple form so as to not obscure other aspects of the present disclosure.

Continuing, network 108 can be part of a telecommunication network that connects subscribers to their immediate service provider. In some instances, network 108 can be associated with a telecommunications provider that provides services to user devices 102, 104, and 106. For example, network 108 may provide voice, SMS, video, or data services to user devices corresponding to users that are registered or subscribed to utilize the services provided by a telecommunications provider. Similarly, network 108 may provide services to user devices that correspond to relays, fixed sensors, internet of things (IoT) enabled devices, or any other device that provide connectivity or data to other devices. Network 108 can comprise any communication network providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network. In aspects, the network 108 may enable communication over both TDD and FDD technology.

Generally, access point 114 is configured to communicate with user devices, such as user devices 102, 104, and 106 that are located within the geographical area, or cell, covered by radio antennas of a cell site (i.e. access point 114). Access point 114 can include one or more base stations (such as a gNodeB), base transmitter stations, radios, antennas, antenna arrays, power amplifiers, transmitters/receivers, digital signal processors, control electronics, GPS equipment, and the like. Access point 114 can include a wireless communications station that is installed at a fixed location, (e.g., a telecommunication tower) or a mobile base station (e.g., small cell) in some embodiments. In some embodiments, access point 114 also includes or is associated with an LTE System Manager (LSM) configured to manage a master list (e.g., a table) of amplitude weights. The list of amplitude weights may include a plurality of amplitude, phase, and power weights applicable to a plurality of antennas, antenna model numbers, radios, tilt angles of antennas, and the like. The listing may also include amplitude, phase, and power weights applicable to various broadcast configurations, such as multi-beam or unified beam.

Illustrative wireless telecommunications technologies include CDMA, CDMA2000, GPRS, TDMA, GSM, WCDMA, UMTS, and the like. Radio 516 might additionally or alternatively facilitate other types of wireless communications including Wi-Fi, WiMAX, LTE, 5G, or other VoIP communications. As can be appreciated, in various embodiments, radio 516 can be configured to support multiple technologies and/or multiple radios can be utilized to support multiple technologies.

The back-end system can include one or more computing devices or servers 108, which are connected to the RAN. For example, machine-learning algorithms can be leveraged to identify patterns and predict changes in the network environment, including movement patterns of UEs. Machine learning algorithms include Regression algorithms, Instance-Based algorithms, Regularization algorithms, Decision Tree algorithms, Bayesian algorithms, Clustering algorithms, Association Rule Learning algorithms, Artificial Neural Network algorithms, Deep Learning algorithms, Dimensionality Reduction algorithms, Ensemble algorithms, to name a few.

Trace Manager 110 may exist as a standalone component or it may be integrated with another component in network environment 100. The location of Trace Manager 110 within network environment 100 is not important as long as it can perform its intended functions. Trace Manager 110 may request a trace job to be performed and to receive a trace report including the results, wherein the trace report contains performance data used by Trace Manager 110. Trace Manager 110 may receive the trace report from a trace processor. A trace processor may be any component, or a subcomponent (not shown), of network environment 100 that processes a trace and/or produces a trace report (e.g., RAN Node, AMF, PCF, SMF).

A trace job typically takes the form of a signaling based subscriber and equipment trace ("UE Trace") or a cell traffic trace ("Cell Trace"). A UE Trace targets a specific UE by its International Mobile Subscriber Identity (IMSI) or International Mobile Equipment Subscriber Identity (IMEI). A Cell Trace decides what UEs will be measured based on whether they are connected to certain specified radio network cell. A Minimization of Drive Test ("MDT") is an extension of UE Trace and Cell Trace where measurements provided by the UE add the UE's experience on performance while also providing an evaluation of network performance per physical location. MDT measurements include, but are not limited to, Radio Link Failure (RLF) reports, RRC Connection Establishment Failure (RCEF) reports, raw signaling messages, and UE location information.

Trace Manager 110, or another component, may request one or more trace jobs, which may include MDT measurements. For example, as part of a routine operation, a Cell Trace may be requested at predetermined intervals or as desired across one or more radio network cells. As another example, UE 102 may be located with a UE Trace to determine that UE 102 is connected within network environment 100 through access point 114 and then a Cell Trace may be requested for nearby UEs (e.g., UE 104 and UE 106) serviced by access point 114. The nearby UE 104 and UE 106 may be part of a greater number of UEs serviced by access point 114, but may be chosen due to their proximity to UE 102, thus providing the advantage of requiring less processing power to make optimal device configuration determinations and to be able to target individual user devices or a plurality of user devices within a defined geographic area. In yet another example, a trace request may automatically be generated upon UE 102 setting up a connection with access point 114. Trace Manager 110 or another component may be identified as the Trace Collection Entity to receive a trace report generated from a trace job, however, what is ultimately important is that Trace Manager 110 receives, in some form, the information generated from the trace job.

Trace Manager 110 may request access to a subscriber and UE profile of UE 102, wherein UE 102 may or may not have been included as a UE whose measurements were captured in a trace report, from database 112 (e.g., an HSS or UDM). The subscriber and UE profile includes device make/model, device capabilities, and subscription details used by Trace Manager 110 to perform a compatibility analysis. Trace Manager 110 uses performance data available from a trace report to determine network coverage (e.g., 4G and 5G coverage with hand-off and failure rates) and geo-centric usage metrics (e.g., network experience and wireless communication technology configuration of nearby devices) in order to perform a geo-service analysis.

After one or more of a geo-service analysis or compatibility analysis, Trace Manager 110 may identify UE 102 as not operating with an optimal wireless communication technology configuration. For example, results of a compatibility analysis of UE 102 may indicate that UE 102 is compatible with both 4G and 5G wireless communication technologies (e.g., device capabilities and subscription), and results of a geo-service analysis may indicate an experience and configuration of near-by devices (e.g., UE 104 and 106). One or more of the compatibility analysis and the geo-service analysis may be used to determine that an optimal device configuration associated with a wireless communication technology is for UE 102 to utilize both 4G and 5G. In this example, if the current device configuration of UE 102 is determined to be only 4G, UE 102 may be identified as having a modified wireless communication technology configuration. After UE 102 has been identified as having a current wireless communication technology configuration which is different from a determined optimized wireless communication technology (e.g., UE 102 has been identified as having a modified wireless communication technology configuration), Trace Manager 110 instructs the now identified UE 102 to operate using the determined optimal device configuration associated with wireless communication technologies (e.g., to operate using the device configuration of near-by users having a good experience and similar compatibility). Trace Manager 110 may instruct UE 102, such as by requesting access point 114 to instruct UE 102, to operate using the determined optimized device configuration associated with a wireless communication technology (e.g., turn on/off 5G, VoNR, VoWiFI, etc.) Reconfiguration instructions that are ultimately received by UE 102 may originate in the Trace Manager 110 or another component, or a subcomponent (not shown), and may take any suitable communication pathway through network environment 100 to reach UE 102. Trace Manager 110 may notify UE 102 of actions being taken either before the actions are taken (e.g., receiving confirmation from UE 102 to continue forward and change its current device configuration to the determined optimized configuration) or after the actions are complete (e.g., to provide UE 102 with a summary of what actions were taken).

In another example, results of a compatibility analysis and/or a geo-service analysis may cause Trace Manager 110 to determine that UE 102 is compatible with both 4G and 5G wireless communication technologies and that an optimal device configuration associated with a wireless communication technology for UE 102 is 4G only. In this example, if the current device configuration of UE 102 is determined to be both 4G and 5G, UE 102 may be identified as a UE with a determined current device configuration different from a determined optimal device configuration, and Trace Manager 110 may instruct UE 102 to operate using the determined optimized device configuration.

In yet another example, results of a compatibility analysis and/or a geo-service analysis may cause Trace Manager 110 to determine that UE 102 is compatible with both 4G and 5G wireless communication technologies and that an optimal device configuration associated with a wireless communication technology for UE 102 is only 4G. In this example, if the current device configuration of UE 102 is determined to be only 4G, UE 102 may be identified as a UE with a determined current device configuration similar to a determined optimal device configuration. In this scenario, Trace Manager 110 will not send device configuration operating instructions to UE 102, however, Trace Manager 110 may notify UE 102 that it is currently operating with an optimal device configuration.

Figure 2:
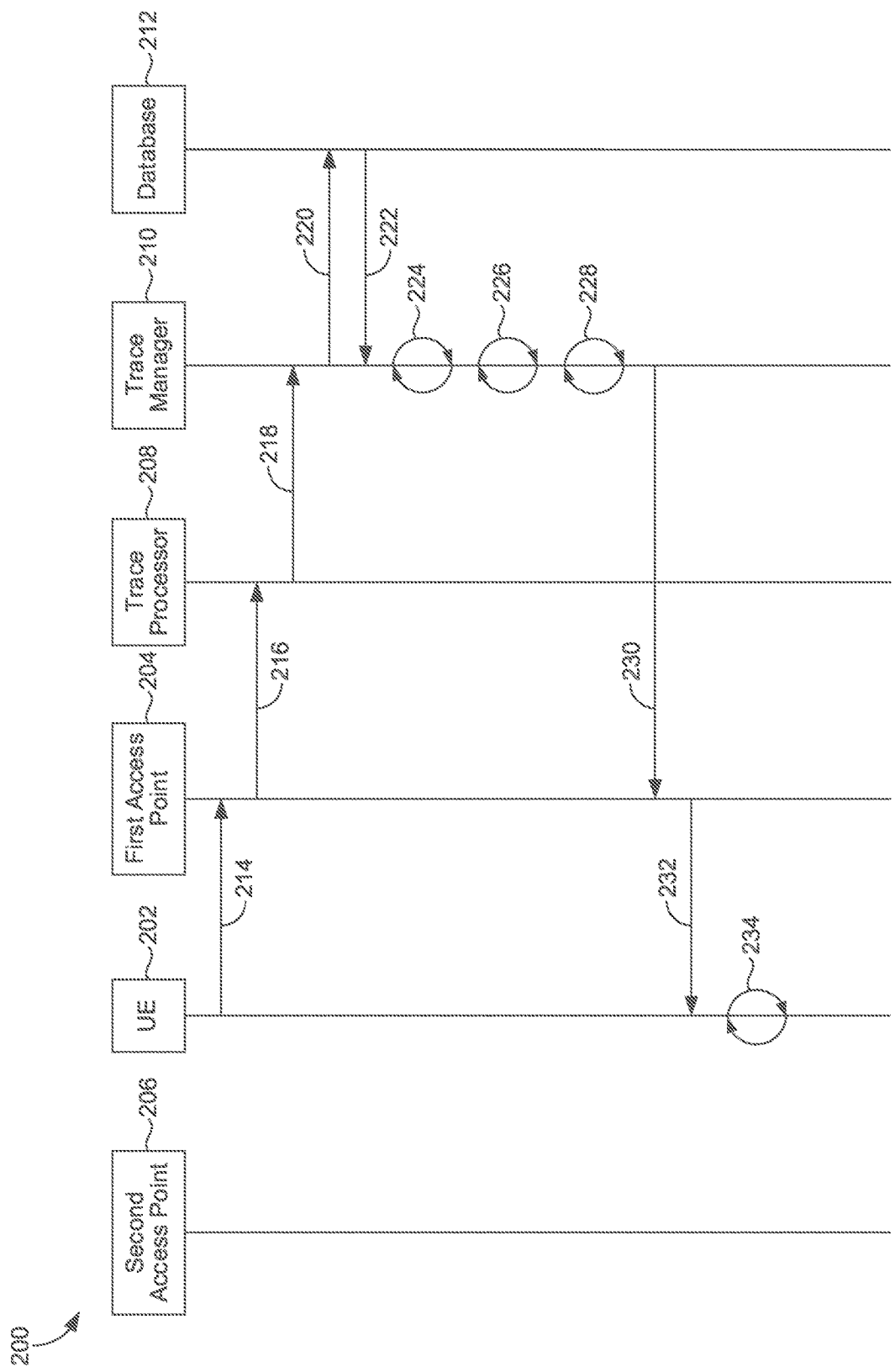
FIG. 2 depicts a flow diagram of an exemplary implementation method for managing device configuration optimization in accordance with embodiments of the present invention.

Turning now to FIG. 2, a procedure 200 is illustrated that is suitable for being performed in accordance with any of the one or more aspects of the present disclosure. Procedure 200 comprises a first UE 202, a first access point 204, a second access point 206, a trace processor 208 which may take the form of a trace processor as described in reference to FIG. 1, a Trace Manager 210 which may take the form of a Trace Manager such as Trace Manager 110 of FIG. 1, and a database 212 which may take the form of a database such as database 112 of FIG. 1. At a first step 214, the UE 202 sends performance data to first access point 204 as requested in a trace job described in reference to FIG. 1. At a second step 216, first access point 204 may transmit the performance data to trace processor 208 in the form of a trace report or, alternatively, all trace processing may occur at first access point 204 and the trace report may be transmitted directly to Trace Manager 210. At a third step 218, trace processor 208 processes the trace report and transmits the trace report to Trace Manager 210. At a fourth step 220, Trace Manager 210 requests a subscriber and UE profile of UE 202. At a fifth step 222, Trace Manager 210 receives the subscriber and UE profile of UE 202. At a sixth step 224, Trace Manager 210 performs a geo-service analysis. At a seventh step 226, Trace Manager 210 performs a compatibility analysis. At an eighth step 228, Trace Manager 210 determines both a current device configuration associated with wireless communication technologies and an optimized device configuration associated with wireless communication technologies for UE 202. At a ninth step 230, instructions comprising instructing UE 202 to operate using the determined optimized device configuration are transmitted to trace processor 208 or, alternatively, is transmitted directly to first access point 204. At a tenth step 232, first access point 204 transmits the instructions to UE 202. At an eleventh step 234, UE 202 is reconfigured such that UE 202 begins to operate using the determined optimized device configuration. The reconfiguration of UE 202 at the eleventh step may comprise connecting to a second access point 206 and/or operating with the determined optimized device configuration with the first access point 204. The eleventh step 234 may also comprise a notification to UE 202 which requires confirmation by UE 202 before UE 202 may be reconfigured. Furthermore, the eleventh step 234 may comprise a notification to UE 202 detailing whether or not UE 202 was reconfigured, such as if flow 200 was initiated by a user of UE 202 who is trying to achieve an optimal network experience.

Figure 3:
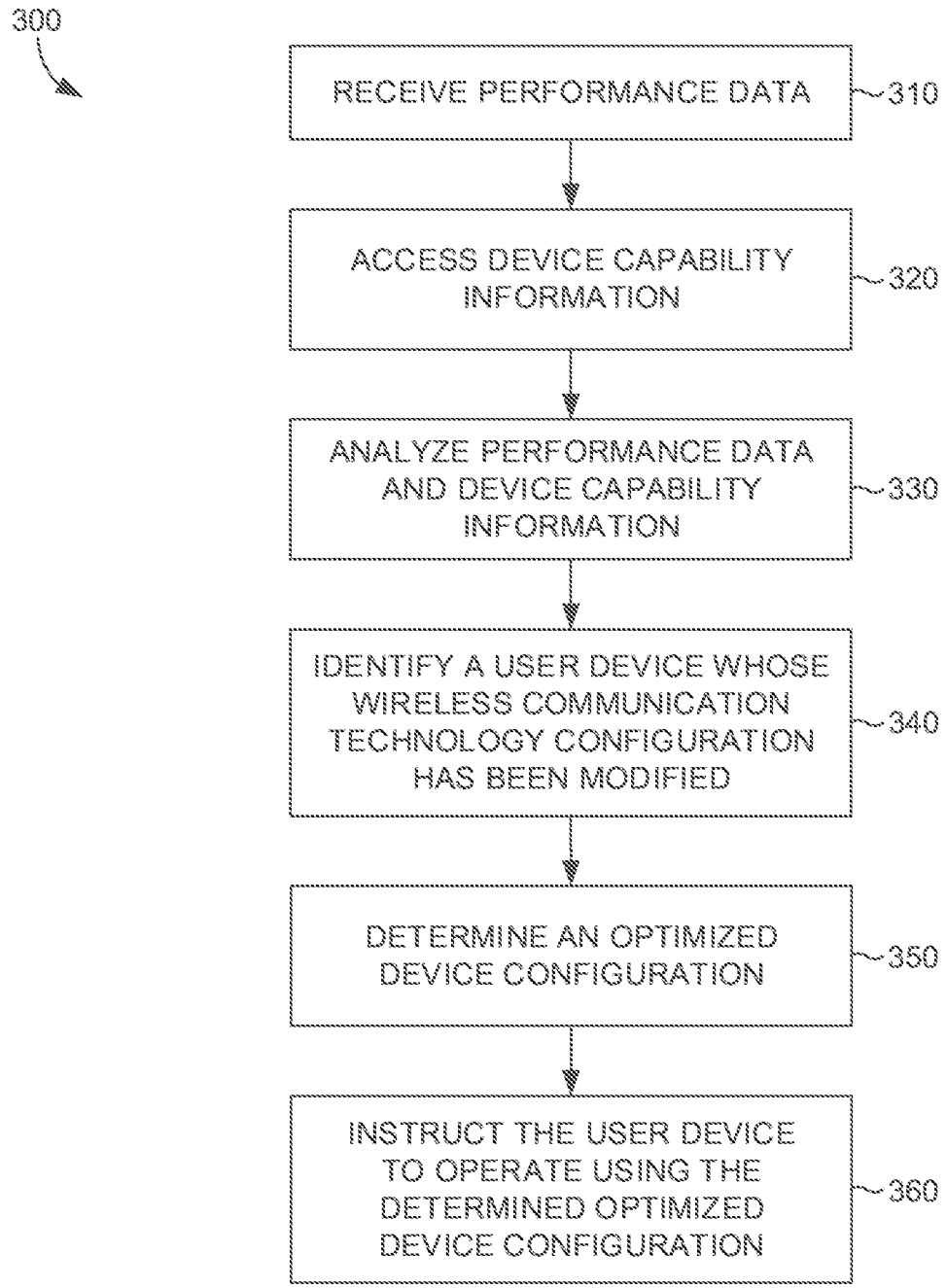
FIG. 3 depicts a flowchart of an exemplary method for managing device configuration optimization in accordance with embodiments of the present invention.
Figure 4:
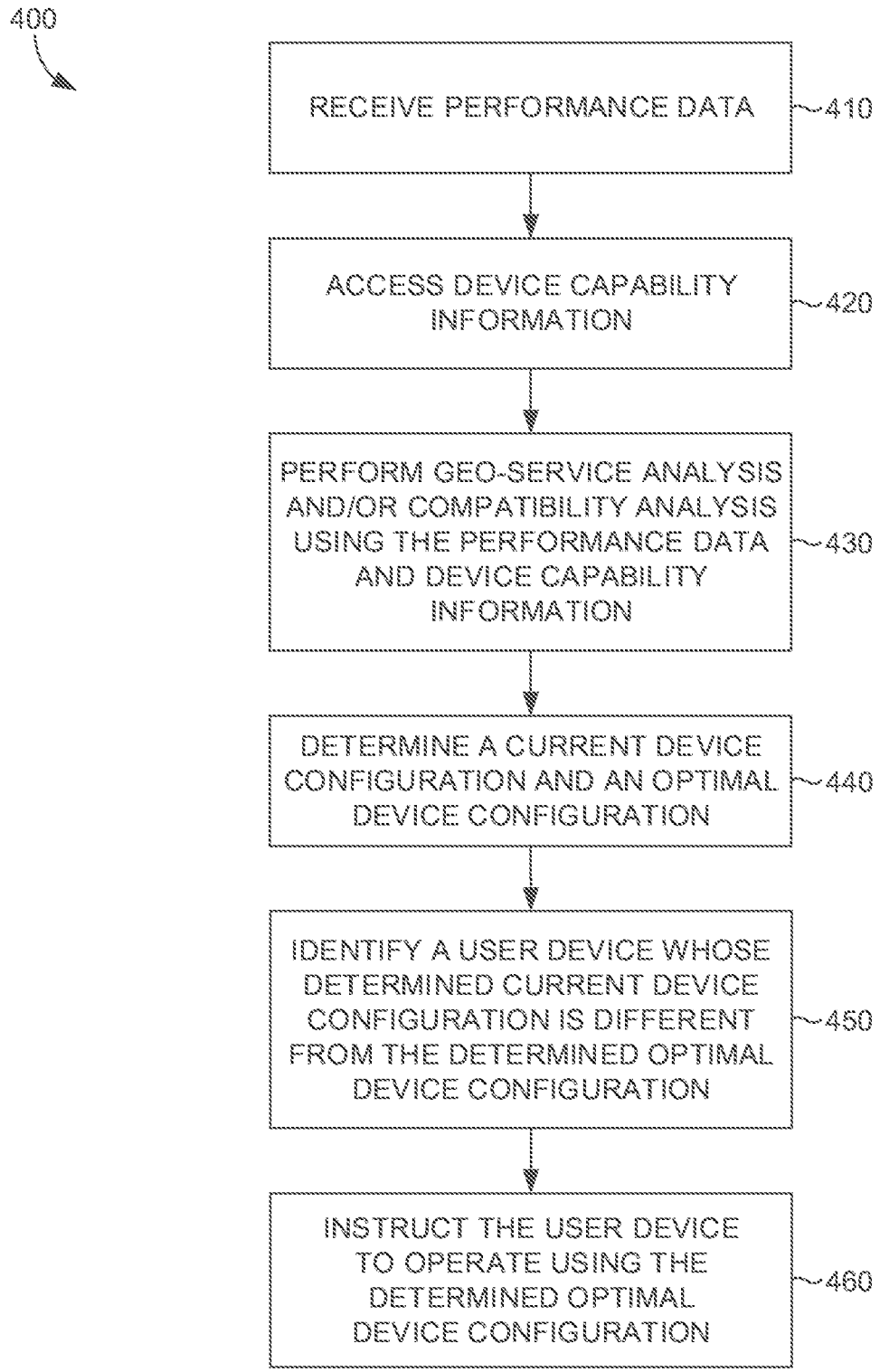
FIG. 4 depicts a flowchart of another exemplary method for managing device configuration optimization in accordance with embodiments of the present invention.

Now referring to FIGS. 3 and 4, each of methods 300 and 400, described herein, can be implemented using any or all of the components and component interactions previously described in FIGS. 1 and 2. As such, the method is discussed briefly for brevity, though it will be understood that the previous discussion and details described therein can be applicable to aspects of the methods of FIGS. 1 and 2. Additionally or alternatively, it will be understood that the methods discussed herein can be implemented or performed via the execution of computer-readable instructions stored on computer readable media, by one or more processors.

With reference to FIG. 3, a flow diagram showing a method 300 for managing the optimization of a device configuration associated with one or more wireless communication technologies is provided in accordance with any one or more aspects of the present disclosure. At block 310, performance data for a plurality of user devices is received (e.g., RLF reports, RCEF reports, raw signaling messages, and UE location information). At block 320, device capability information associated with the plurality of user devices is accessed (e.g., make/model, device type, service type, or subscription details). At block 330, performance data and device capability information is analyzed (e.g., geo-service or compatibility analysis). At block 340, a user device whose use of a wireless communication technology configuration has been modified is identified (e.g., a modification of a device setting causing the user device to communicate using a second wireless communication technology and not a first wireless communication technology). At block 350, an optimized device configuration is determined (e.g., 4G only or 4G/5G). At block 360, the user device is instructed to operate using the determined optimized device configuration (e.g., instructing the user device to modify the device setting causing the user device to communicate using both the first and second wireless communication technologies or instructing the user device to modify the device setting allowing the user device to utilize VoNR).

Turning to FIG. 4, a flow diagram showing a method 400 for managing the optimization of a device configuration associated with one or more wireless communication technologies is provided in accordance with any one or more aspects of the present disclosure. At block 410, performance data for a plurality of user devices is received (e.g., RLF reports, RCEF reports, raw signaling messages, and UE location information). At block 420, device capability information associated with the plurality of user devices is accessed (e.g., make/model, device type, service type, or subscription details). At block 430, one or more of a geo-service analysis or a compatibility analysis using the performance data and device capability information is performed. The one or more of a geo-service analysis or compatibility analysis may further comprise identifying a single user device for which to determine an optimized device configuration for, and analyzing the performance data and device configuration of a user devices in a defined geographic area nearby the single user device. At block 440, a current device configuration and an optimal device configuration associated with use of a wireless communication technology is determined for one or more user devices of the plurality of user devices (e.g., 4G or 4G/5G). At block 450, a user device whose determined current device configuration is different from the determined optimal device configuration is identified (e.g., network experience and configuration of nearby user devices indicate an optimal device configuration different from a current device configuration). At block 460, the identified user device is instructed to operate using the determined optimal device configuration (e.g., instructing the user device to modify the device setting causing the user device to communicate using both the first and second wireless communication technologies or instructing the user device to modify the device setting allowing the user device to utilize VoNR).

Figure 5:
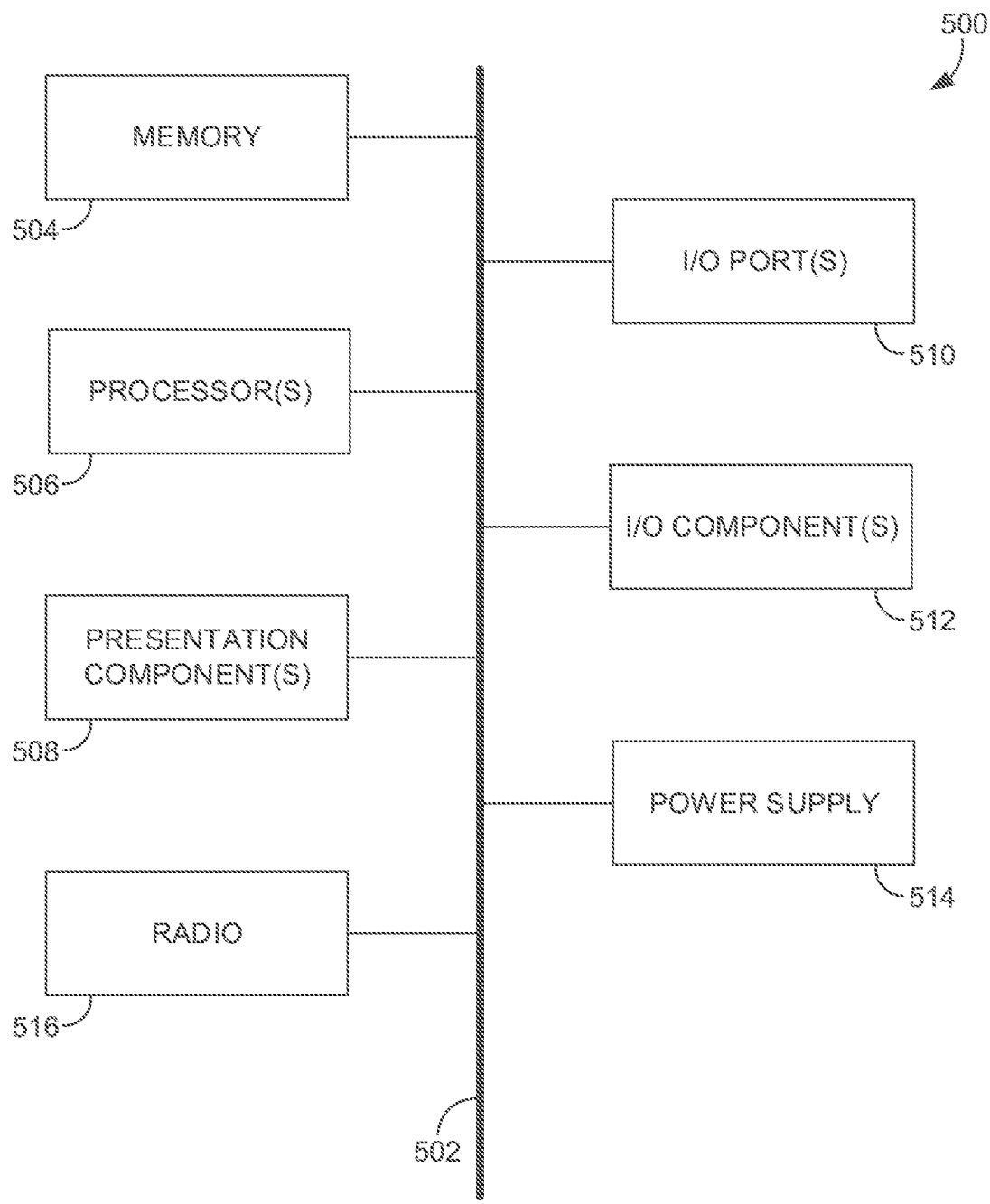
FIG. 5 depicts a block diagram of an exemplary computing environment suitable for use in implementing embodiments herein.

With reference to FIG. 5, computing device 500 includes a bus 502 that directly or indirectly couples the following devices: memory 504, one or more processors 506, one or more presentation components 508, input/output (I/O) ports 510, input/output (I/O) components 512, and an illustrative power supply 514. Bus 502 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterate that the diagram of FIG. 5 is merely illustrative of an example computing device that can be used in connection with one or more embodiments of the present invention. Distinction is not made between such categories as "workstation," "server," "laptop," "handheld device," etc., as all are contemplated within the scope of FIG. 5 and reference to "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. Computer storage media is non-transitory. In contrast to communication media, computer storage media is not a modulated data signal or any signal per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 504 includes computer-storage media in the form of volatile and/or nonvolatile memory. The memory may be removable, non-removable, or a combination thereof. Example hardware devices include solid-state memory, hard drives, optical-disc drives, etc. Computing device 500 includes one or more processors that read data from various entities such as memory 504 or I/O components 512. Presentation component(s) 508 present data indications to a user or other device. Example presentation components include a display device, speaker, printing component, vibrating component, etc.

I/O ports 510 allow computing device 500 to be logically coupled to other devices including I/O components 512, some of which may be built in. Illustrative components include a microphone, joystick, game pad, satellite dish, scanner, printer, wireless device, etc.

Radio 516 represents a radio that facilitates communication with a wireless telecommunications network. Illustrative wireless telecommunications technologies include CDMA, GPRS, TDMA, GSM, W-CDMA, EDGE, CDMA2000, and the like. Radio 516 might additionally or alternatively facilitate other types of wireless communications including Wi-Fi, WiMAX, LTE, 5G, or other VoIP communications. As can be appreciated, in various embodiments, radio 516 can be configured to support multiple technologies and/or multiple radios can be utilized to support multiple technologies.

The invention claimed is:

1. A method for managing device configuration optimization over a wireless communications network, the method comprising:
    receiving performance data for a plurality of user devices;
    accessing device capability information associated with the plurality of user devices;
    based on an analysis of the device capability information and the performance data, identifying at least one of the plurality of user devices whose configuration associated with use of a wireless communication technology has been modified;
    determining an optimized device configuration for the at least one of the plurality of user devices; and
    instructing the at least one of the plurality of user devices to operate using the determined optimized device configuration.

2. The method of claim 1, wherein the configuration modification associated with the use of the wireless communication technology further comprises a modification of a device setting causing the user device to communicate using a second wireless communication technology and not a first wireless communication technology.

3. The method of claim 2, wherein the instructing the at least one of the plurality of user devices to operate using a determined optimized device configuration further comprises instructing the user device to modify the device setting causing the user device to communicate using both the first and second wireless communication technologies.

4. The method of claim 3, wherein the instructing the at least one of the plurality of user devices to operate using a determined optimized device configuration further comprises instructing the user device to modify the device setting allowing the user device to utilize Voice over New Radio (VoNR).

5. The method of claim 1, wherein the performance data comprises one or more of an RLF report, RCEF report, raw signaling messages, or user device location information.

6. The method of claim 1, wherein the device capability information comprises one or more of subscription details, make, or model of a user device.

7. The method of claim 1, wherein the analysis of the device capability information and performance data comprises one or more of a geo-service analysis or compatibility analysis.

8. The method of claim 7, wherein the geo-service analysis further comprises analyzing the performance data and device configuration of a subset of user devices within the plurality of user devices in a defined geographic area.

9. The method of claim 7, wherein the compatibility analysis further comprises analyzing a device type and service type for a user device within the plurality of user devices.

10. A method for managing device configuration optimization over a wireless communications network, the method comprising:
    receiving performance data associated with a plurality of user devices;
    accessing device capability information associated with the plurality of user devices;
    performing one or more of a geo-service analysis or a compatibility analysis using the performance data and device capability information;
    based on the one or more of the geo-service analysis or the compatibility analysis, determining a current device configuration and an optimal device configuration for one or more user devices of the plurality of user devices, wherein the device configuration is associated with use of a wireless communication technology;
    identifying at least one user device of the one or more user devices whose determined current device configuration is different from the determined optimal device configuration; and
    instructing the at least one user device whose determined current device configuration is different from the determined optimal device configuration to operate using the determined optimized device configuration.

11. The method of claim 10, wherein the device configuration associated with the wireless communication technology further comprises one or more of a 4G or a 5G wireless communication technology.

12. The method of claim 11, wherein the current device configuration is determined to be 4G.

13. The method of claim 12, wherein the instructing the one or more user devices to operate using a determined optimized device configuration further comprises instructing the user device to modify the device setting causing the user device to communicate using both 4G and 5G wireless communication technologies.

14. The method of claim 10, wherein the performance data further comprises one or more of an RLF report, RCEF report, raw signaling messages, or user device location information.

15. The method of claim 10, wherein the device compatibility information comprises one or more of subscription details, make, or model of a user device.

16. The method of claim 10, wherein the geo-service analysis further comprises analyzing the performance data and device configuration of a subset of user devices within the plurality of user devices in a defined geographic area.

17. The method of claim 10, wherein the compatibility analysis further comprises analyzing a device type and service type for a user device within the plurality of user devices.

18. A system for managing device configuration optimization over a wireless communications network, the system comprising:
    a mobile communications network that includes one or more wireless communication technologies;
    a trace processor configured to process trace reports and provide the trace reports to a trace manager, wherein the trace manager is configured to:
        receive performance data associated with a plurality of user devices;
        request device capability information associated with the plurality of user devices;

perform an analysis of the device capability information and the performance data, identifying at least one of the plurality of user devices whose configuration associated with a wireless communication technology has been modified;

determine an optimized device configuration for the at least one of the plurality of user devices; and instruct the at least one of the plurality of user devices to operate using the determined optimized device configuration.

19. The system of claim 18, wherein the configuration modification associated with the use of the wireless communication technology further comprises a modification of a device setting causing the user device to communicate using a second wireless communication technology and not a first wireless communication technology.

20. The system of claim 19, wherein the instructing the at least one of the plurality of user devices to operate using a determined optimized device configuration further comprises instructing the user device to modify the device setting causing the user device to communicate using both the first and second wireless communication technologies.

* * * * *